Patented Jan. 13, 1953

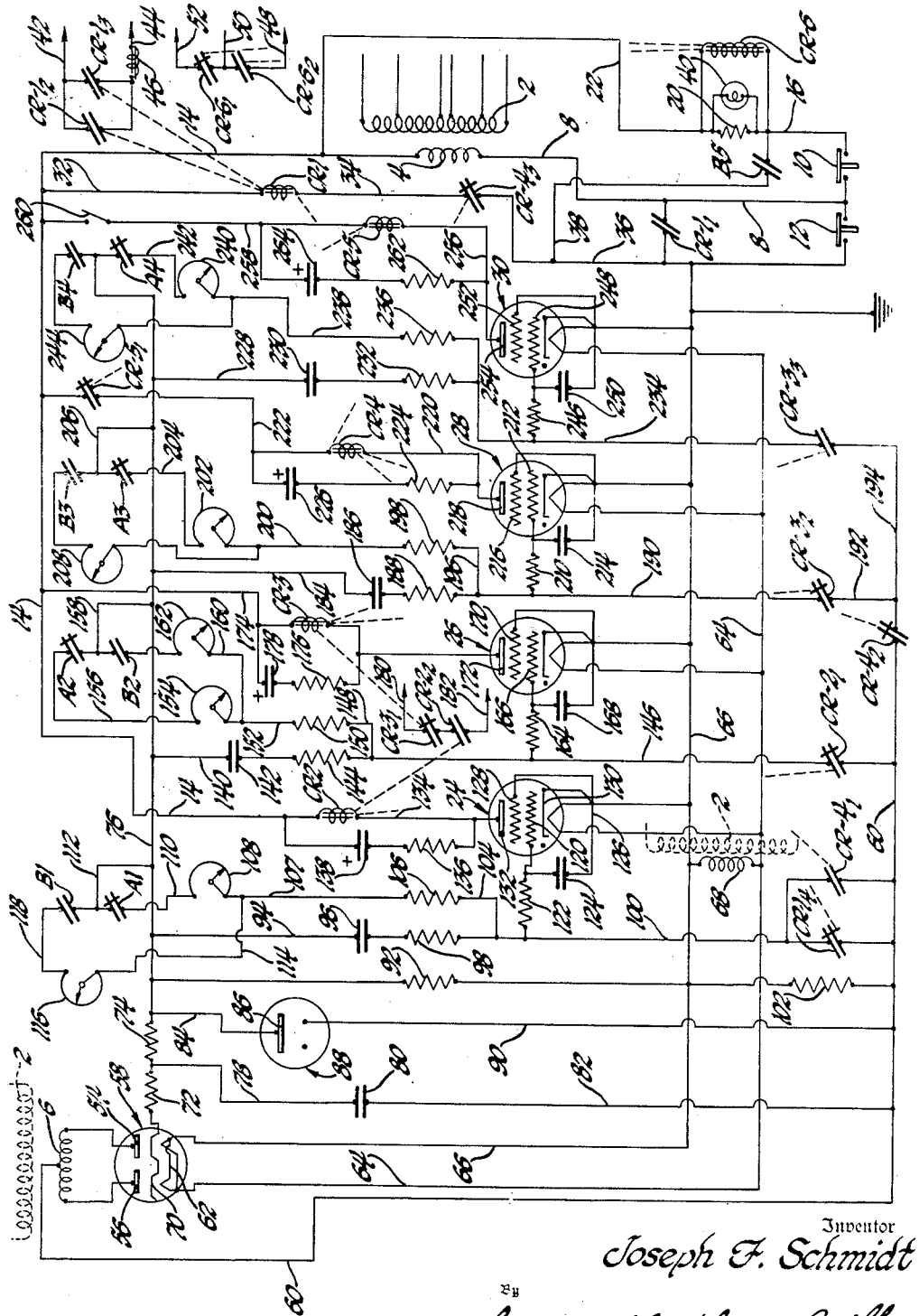

2,625,651

UNITED STATES PATENT OFFICE 2,625,651

WELDING CONTROL

Joseph F. Schmidt, Scotch Plains, N. J., assignor to General Motors Corporation, Detroit, Mich., a corporation of Delaware Application March 25, 1949, Serial No. 83,476

7 Claims. (Cl. 250—27)

This invention relates to control means and more specifically to control means for providing from a single master control panel a multiple control system providing alternately a plurality of different welding speeds or pulses per time interval. In the past, when it has been necessary to provide an operator at a certain assembly station with welding guns that produce different speeds or duration of operation to produce different welding heats, it has been necessary to provide a separate welding gun and an adjustable control panel therefor for each different commonly used speed. If, for example, an operator found it necessary in his normal day's work to use four different speeds of welders, then he was provided with four welding guns and four complete control panels, one for each gun. It is obvious that this caused a great deal of duplication of apparatus.

It is an object of my invention, therefore, to provide a basic control panel for welders that is capable of providing welding power at different settings to a plurality of guns, thus saving much duplication of apparatus.

It is a further object of my invention to provide a plurality of speeds for welding from a single control panel.

It is a still further object of my invention to provide a single control panel capable of supplying a plurality of welding guns operating at different speeds.

With these and other objects in view which will become apparent as the specification proceeds, my invention will be best understood by reference to the following specification and claims and the illustrations in the accompanying drawings, in which the figure is a circuit diagram of my control system.

Before beginning with a detailed description of the system shown in the figure, it is desired to explain that the switch contactors operated by the various switching means are herein shown at an angle so that they may be differentiated from the electrical condensers used in the system which are in turn shown in a horizontal position. There are also included several control relay coils which operate either to close or to open a plurality of contactors in their operation, and in order to simplify the showing of the electrical circuit these contactors have in many instances been shown at some distance from the operating coil, as it would make it entirely too complicated and difficult to understand the system if they were placed adjacent their operating coil. In order, however, to tie together the operating coil with its contacts, the coil will be designated as, for example, CR-1, and the contactors which it operates will be designated by the same general reference character, namely CR-1, with a subnumeral 1 or 2, depending on how many contactors are operated thereby. In conventional manner, also, the contactors which are normally closed when the relay coil is deenergized are shown with a line through them and those normally open, without.

Referring now more particularly to the drawing, there is shown a main transformer primary 2, which supplies power for the control system and which has associated therewith in inductive relation a plurality of secondaries, the first, 4, shown in juxtaposition thereto and a second primary, 6, shown in the upper left hand corner of the drawing when read from the side, and which has been placed in that location for convenience, but which is actually located in the same manner as secondary 4 in inductive relation to primary 2. Other secondary coils will be specifically referred to at a later point. In general, it might be said that the present system has been shown as capable of providing two different frequencies of operation, although it would be very simple and within the scope of my invention to provide from a similar system more than two, as will be obvious from further description.

One end of the secondary 4 of the transformer is connected through line 8 to one side of each of two operating switches 10 and 12, one being operated by the operator to obtain one frequency or speed of operation and the other for the second frequency. These may be multiplied, of course, as more frequencies are added to the system. The other terminal of the secondary 4 is connected to one of the main power supply lines 14. Manually operated switch 10 is also connected through line 16 to one side of a resistance 20, the opposite side of which is connected through line 22 back to main power lead 14.

It is well known that in welding procedure the complete welding cycle is broken down into portions or partial cycles during which certain phases of the operation are performed. It is, of course, first necessary to clamp the work to be welded between the welding electrodes prior to the application of welding current; second, to apply welding current to the clamped articles to cause fusion; third, to hold the articles in juxtaposition after cessation of the welding current to permit the fused metal to solidify and hold; and lastly, to provide a certain deenergized period during which the material may be moved from the machine and other material applied or the machine moved along the bodies to be welded together. These four periods may be identified as the "squeeze," "weld," "hold" and "off" times, and in most conventional welders means are provided for varying these time intervals, depending upon the particular requirements of the work being acmomplished. In order to control each of these four time periods there are provided in my circuit four thermionic discharge tubes 24, 26, 28 and 30—24 controlling the squeeze period time, 26 controlling the weld power application time, 28 the hold time, and 30 the off time. In order also to control the length of the operative periods of each of these tubes, there are provided a series of relay coils which will be numbered in the order of their operation in the circuit and these are CR-1, CR-2, CR-3, CR-4, CR-5 and CR-6.

The specific circuit connections for connecting the parts indicated generally will now be described.

Main power line 14 has connected thereto line 32, which connects with one end of control relay CR-1, the opposite end of which is connected through line 34 to a pair of normally closed contacts CR-4$_3$, which are in turn connected through line 36 to manual switch 12. A pair of normally open relay contacts CR-1$_1$ are connected across manual switch 12 between lines 8 and 36. Line 38 interconnects line 36 with normally open relay contacts B-5 of a series of switches to be described, which are in turn connected to line 16. An indicating means 40, such as a neon light, is connected across resistance 20 to indicate when this part of the system is energized. Also connected across the same point is the operating coil for control relay CR-6. Control relay CR-1 operates several sets of contactors, some of which are in different or separated control circuits. Two of these are identified as normally open contacts CR-1$_2$ and CR-1$_3$ in parallel in a circuit identified by two conductors 42 and 44 which extend to the power supply for the solenoid clamping valve of a given welding gun, the solenoid valve 46 being connected in this line and adapted to be energized when either set of contacts CR-1$_2$ or CR-1$_3$ are closed. Normally, of course, both would close, but dual contacts are used to make sure that this circuit is closed during operation.

While there has been shown the above identified circuit for operating the solenoid clamping valve, there is an additional control circuit partially shown indicated by conductive lines 48, 50 and 52. Inasmuch as other solenoid valves must be actuated for additional welding guns, since each gun has its own solenoid valve, then when one system is utilized with its gun, one solenoid will be closed, whereas when a second system is utilized with a different gun, at a different frequency, it will be necessary to operate a different solenoid valve. This is accomplished through the use of the control circuits 48, 50, 52, in which case line 50 is a power line, line 52 extends to solenoid valve #1 and line 48 extends to solenoid valve #2. In circuit between lines 50 and 52 is a normally closed pair of contacts CR-6$_1$ and between lines 48 and 50 is a normally open pair of contacts CR-6$_2$. It might be briefly explained here that under operation in the system, when valve #1 is utilized, it would be energized upon closure of relay CR-1 throught normally closed contacts CR-6$_1$, that relay not being energized at all when only gun #1 is used and switch 12 actuated. However, when it is desired to use the second system and energize valve #2, then the switch is made from valve #1 to valve #2 by the energization of relay CR-6, which opens normally closed contacts CR-6$_1$ and closes normally open contacts CR-6$_2$. It will be obvious at this point that this switching action occurs upon the closure of switch 10 manually.

Directly connected to the terminals of the secondary 6 of the supply transformer 2 are two electrodes 54 and 56 of a rectifier tube 58, the center tap of said secondary being connected to a conductive line 60. The filaments 62 of the rectifier tube are connected directly across lines 64 and 66, which lines are supplied with low voltage power from a third secondary winding 68 in inductive relation with the primary 2. These two lines incidentally in like manner feed the heating elements of the electron tubes 24, 26, 28 and 30 in an obvious manner. The opposite electrodes 70 of the rectifier tube are directly connected to a resistor 72, which is in series with a second resistor 74, the latter being directly connected to power line 76. The potential of the output of the rectifier tube in this instance is between line 76 and line 66 and is 60 volts D. C. Line 78 is connected intermediate resistances 72 and 74 and extends down to one side of a capacitor 80, the opposite side of which is directly connected through line 82 to line 60. Line 84 extends from line 76 to one electrode 86 of a regulator tube 88, the opposite terminal of which is connected through line 90 to line 60. A resistance 92 is connected directly across lines 76 and 66.

Line 94, connected to buss line 76, extends to one side of the condenser 96, which is in turn serially connected with a resistance 98 and thence through conductor 100 to a pair of normally closed contacts CR-1$_4$ actuated by relay CR-1. A resistor 102 is connected between lines 66 and 60. A pair of normally open contacts CR-6$_1$ are connected in parallel around the normally closed contact CR-1$_4$. A branch or tap line 104 is connected between line 100 and one end of a resistor 106, the opposite end of which is connected to an adjustable potentiometer 108 through line 107 and the opposite terminal of 108 is connected to line 110, which in turn is connected to a normally closed pair of contacts A1, the opposite terminal of which is directly connected to line 76 through line 112. A second and similar path is provided between line 107 and 112 which may be switched in to give a different timed periodicity through line 114, which is connected to a second adjustable potentiometer 116 and thence through a serial line 118 to a pair of contacts B1.

These control circuits are provided for the tube 24, which, as previously described, controls the time interval for the squeeze time, and the control grid 120 of which is connected through resistance 122 to line 100. To a tap between resistor 122 and grid 120 there is connected a condenser 124, which is then connected through conductive line 126 to the cathode and a screen grid 128 of the tube 24. The cathode 130 of this tube is directly connected to the grounded side of the filament circuit. The plate 132 of this tube is connected to line 134, which terminates at one side of control relay CR-2, the opposite terminal of which is connected to line 14. In shunt circuit around the control relay coil CR-2 there are serially connected a resistor 136 and a condenser 138. All of the equipment described in conjunction with the control system between the regulator 88 to the present point is provided to control the variation in and the on and off times of the squeeze interval.

A similar adjustable timing control is provided for tube 26, which controls the length of the time that the welding current is applied and has been previously referred to as the weld interval. This circuit consists of the following: line 140 is connected to main buss 76 and also to an electrical condenser 142, which is in turn connected to a resistor 144, the opposite terminal of which is connected through line 146 to one side of a pair of normally closed contacts CR–$2_1$, the other side being connected to line 60. A tap line 148 is connected to line 146 and to resistor 150, the opposite end of the same being connected through line 152 with a variable potentiometer 154. The opposite terminal of the potentiometer 154 is connected to a conductive line 156 which extends to a pair of normally closed contacts A2, these contacts being also connected through line 158 back to main line 76. A second parallel circuit extending between lines 152 and 76 is provided by line 160, potentiometer 162, and a pair of normally open contacts B2 in series between these two lines. A resistor 164 is directly connected to line 146 and also to control grid 166 of tube 26. A condenser 168 is connected between the grid and cathode of this tube and the screen grid 170 of this tube is connected to the cathode also. The plate 172 of the tube 26 is connected directly to one side of the control relay CR–3, the opposite side of which is connected through line 174 with main line 14. In shunt circuit around the control relay CR–3 are resistance 176 and condenser 178 in series relation.

Since the weld circuit per se is not shown, there have been illustrated two lines 180 and 182, which are connected back to complete the initiating circuit for the weld current, and in this circuit are included two contacts in series, first a pair of normally open contacts CR–$2_2$, and a pair of normally closed contacts CR–$3_1$, and it will be obvious that upon the energization of relay CR–2 and the closure of its associated contacts CR–$2_2$ that the igniting circuit will be completed and the weld current started and that it will flow until relay CR–3 is energized, which will open its contacts CR–$3_1$ to break this circuit.

Passing now to the control circuit associated with the tube 28, which controls the hold time, line 184 is connected to main line 76 and to a capacitor 186, which is in turn connected in series relation with a resistance 188, the opposite side of which is connected through line 190 to one side of a pair of normally closed contacts CR–$3_2$, the other contact being connected through line 192 to line 194. A pair of normally closed contacts CR–$4_2$ is connected between lines 60 and 194. Line 196 is connected to an interconnecting line 196, which extends to resistor 198, the opposite end of which is connected to line 200, running to one side of an adjustable potentiometer 202. The other side of the potentiometer is connected by a line 204 with a pair of normally closed contacts A3, and thence through line 206 to main line 76. In parallel relation from line 200 to line 76 in the system just described, there is a second adjustable potentiometer 208 and a pair of normally open contacts B3. A resistance 210 is connected to line 190 and also to the control grid 212 and a condenser 214 is connected between the grid and cathode of the tube, the screen grid 216 being also connected to the cathode. The plate 218 is directly connected through line 220 to control relay CR–4 and thence through line 222 to a pair of normally closed contacts CR–$5_1$, the opposite side of which is connected to main line 14. A resistance 224 and a condenser 226, connected in series relation, are also connected in shunt around relay CR–4.

Taking up lastly the control circuit for tube 30, which controls the off time and is the last of this series of tubes, there is provided a conductive line 228, which is connected to condenser 230. That in turn is connected to one side of a resistance 232, the opposite terminal of which is connected to conductive line 234. Line 234 extends to a pair of normally open contacts CR–$3_3$, the opposite side of which is connected to line 194. Line 234 is also connected to resistor 236 and line 238 is connected to the other side of the resistance. This line is also connected to one side of a variable potentiometer 240, the opposite terminal of which is connected through line 242 to one side of a pair of normally closed contacts A4, the opposite side of which is directly connected to line 76. A second circuit is provided between the lines 238 and 76 through a variable potentiometer 244, and a pair of normally open contacts B4. A resistor 246 is connected to line 234 and also to control grid 248 of tube 30. A condenser 250 is connected between the grid and the cathode and the screen grid 252 is connected to the cathode. The plate 254 of this tube is directly connected through line 256 to control relay CR–5 and thence through line 258 to a manually operated switch 260 and thence to main line 14. A resistance 262 and a capacitor 264 are connected in shunt around control relay CR–5.

The various switches identified as A1, A2, etc., and B1, B2, etc., are merely parts of a double-throw multi-pole switch so that either one set of contacts is closed or the other, to control the various circuits in which they appear.

In general, therefore, the present system has been devised so that each of the four different periods into which a complete welding cycle is divided may be independently adjusted to different lengths of time. As will be obvious from the previous description, the operating or conducting periods of the four electronic control tubes 24, 26, 28 and 30 can be adjusted to control respectively the squeeze time, weld time, hold time and off time. Once they are adjusted in a manner to be more specifically described, this control system, therefore, provides a certain timed sequence of welder to be used with a gun which is actually used to produce a weld. For example, before setting the system up, a certain predetermined squeeze time is desired, and that may be adjusted by moving the movable arm on potentiometer 108 to a given point which will produce that time interval in delaying the firing of tube 24. At the same time the time interval periods for the other tubes of the complete weld cycle, namely, 26, 28 and 30, are likewise adjusted by setting the positions of the movable arms of the potentiometers 154, 202 and 240. When all of these time periods have been adjusted and set as desired, their total, therefore, gives the time period for one complete weld cycle and the operator using this control system in conjunction with a gun may weld at that given periodicity when desired.

However, as mentioned earlier in the specification, it is often necessary to use other time periods of spot welds and my system is so designed that by a simple switching operation, the control system may be quickly and easily converted into a control system having different lengths of periods as pointed out above. For example, for the second periodicity required, potentiometers 116, 162, 208 and 244 are set to provide new and different times for the four portions of the welding cycle controlled by tubes 24, 26, 28 and 30, and simply by throwing the multi-pole switch A—B from position A to position B, the system will now provide to a second welding gun a different periodicity of operation.

More specifically describing the sequence of operation of the device, let us assume that switch A—B is in the A position, as shown on the drawings, and therefore that all of the A switches are closed, as shown. This will provide a certain period of operation as determined by the setting on the potentiometers 108, 154, 202 and 240. Assuming that the weld gun has been properly connected, the operator now closes hand operated switch 12. This closure completes the circuit to control relay CR–1 as follows, assuming, of course, that the primary 2 of the main power transformer is connected to the supply lines: from secondary 4 of this transformer through line 14, line 32, relay CR–1, normally closed contacts CR–4$_3$, line 36, manual switch 12, and line 8, back to the secondary 4. Control relay CR–1 is now energized and immediately closes a plurality of contacts, the first two of which, CR–1$_2$ and CR–1$_3$, are in the solenoid circuit of the first gun, and that is energized for clamping. It also closes at the same time contacts CR–1$_1$, which are in an obvious holding circuit for the relay CR–1 around manual switch 12.

Now the operator may release manual switch 12 and the system will proceed through its normal sequence. Prior to the time that switch 12 was closed, rectifying means 58 was energized from the main power transformer to apply the necessary D. C. voltages to the system. For example, it applies a control voltage of 60 volts D. C. between lines 76 and 66, and 90 volts D. C. between lines 66 and 60. Tube 88 is a voltage regulator tube and tends to stabilize fluctuations in the voltage in these lines. Storage condenser 96 has been charged through the circuit including line 94, condenser 96, resistor 98, line 100, and normally closed contacts CR–1$_4$ up to this time, since they are across lines 76 and 60, which carried the necessary controlled D. C. voltages. However, upon the operation of the control relay CR–1, contacts CR–1$_4$ open, breaking this supply circuit to condenser 96, and it now discharges through resistance 98, resistance 106, and adjustable resistance in the potentiometer 108, which requires a certain predetermined time for such discharge, depending on the values of the resistors. Upon the discharge of said condenser 96, the potential at the grid 120 of tube 24 will change and at the end of a predetermined time interval required for such discharge the potential of this grid 120 reaches a point where it permits tube 24 to conduct.

The conductance of tube 24 causes current to flow in its plate circuit and, therefore, energizes the coil of relay CR–2. This energization of coil CR–2 causes this relay to actuate its contacts. It closes a pair of normally open contacts CR–2$_2$, which are in the weld initiating circuit 180—182 in series with a pair of normally closed contacts CR–3$_1$, and the closure of the CR–2$_2$ contacts, therefore, completes this circuit to the weld initiating control and weld current is turned on. To this point, therefore, we have completed the squeeze portion of the cycle and welding current is now supplied. Simultaneously with the closure of contacts CR–2$_2$, relay CR–2 opens normally closed contacts CR–2$_1$, which break a circuit including storage condenser 142, which has in like manner to storage condenser 96, previously described, been connected across the D. C. supply lines. Storage condenser 142 now discharges through a circuit including resistance 144, resistance 150, variable resistance or potentiometer 154, and contacts A2. The time interval during which condenser 142 discharges is determined by the amount of resistance in circuit therewith, and when the condenser has become sufficiently discharged, reduces the potential on control grid 166 on tube 26 so that the tube becomes conductive and current flowing through the plate circuit thereof energizes relay coil CR–3 to cause the same to actuate its contacts.

It first opens contacts CR–3$_1$, which breaks the circuit to the welding control per se to open the same and stop welding current from flowing, thus ending the welding current cycle. At the same time it opens normally closed relay contacts CR–3$_2$ and breaks the energizing circuit to a third storage condenser 186, which has become charged by being connected across the D. C. power lines. Upon the break of this circuit condenser 186 discharges through resistances 188, 198 and variable resistance 202, to provide a third predetermined time interval at the end of which grid 212 of tub 28 assumes a potential which permits tube 28 to conduct, causing current to flow through its plate circuit and energize relay coil CR–4. The energization of CR–4 thus completes the end of the hold period and actuates a plurality of contacts. It first closes contacts CR–4$_1$, which are in shunt around contacts CR–1$_4$ and thus again completes a charging circuit for storage condenser 96 across power lines 76—60 to place the apparatus in condition for the next cycle. At the same time it opens normally closed contacts CR–4$_2$ to disconnect condensers 186 and 230 from the line, since contacts CR–3$_3$ have previously been closed when relay CR–3 was energized to permit condenser 230 to charge. It also opens normally closed contacts CR–4$_3$ to break the circuit to CR–1 and that relay becomes deenergized to open solenoid circuits. The discharge of condenser 230, when contacts CR–4$_2$ open, is through resistances 232, 236, and variable resistance 240 and upon the discharge thereof the potential on control grid 248 of tube 30 permits this tube to conduct, and the current flowing in the plate circuit thereof energizes control relay CR–5 and it actuates its normally closed contacts CR–5$_1$ to cause deenergization, until re-actuated by closure of manually controlled switch 12.

Thus, each time control switch 12 is closed, the system goes through the just described sequence of operations to provide a certain perdetermined welding cycle. If normally open switch 260 is closed, then the system will automatically repeat, whereas if it is open, it will be a non-repeated operation, manually controlled. If a different frequency of operation of the spots and time intervals is desired, then it is only necessary for the operator to switch the A—B switch over to open all of the A contacts and close the B contacts and the system will then operate in exactly the same manner except that the discharge of the storage condensers providing the time intervals will now be through adjustable potentiometers or resistances 116, 162, 208 and 244 and will thus provide different time intervals than previously set. In that case, the operator will close manually operated switch 10 instead of 12 to initiate action, but the operation will be substantially the same. The neon tube 40, connected across resistance 20, indicates when this control system is in operation and control relay coil CR-6, operating contacts CR-6₁ or CR-6₂ is used in this portion of the control to switch from the solenoid for the first gun to the solenoid for the second.

It will thus be obvious that I have provided in my control system means for utilizing a single basic time control panel for a welder with a simple means for providing therefrom a plurality of adjustable different timing means connected thereto for controlling a plurality of guns therefrom.

I claim:

1. In a welding control means, a plurality of electronic means connected in cascade, each for controlling in sequence the duration of one of the various portions of a complete weld cycle, a plurality of adjustable time control circuits connected to each one of the electronic means to independently control the same and compound switching means in circuit between each of the time control circuits and its associated electronic means to simultaneously switch all of the time control circuits for all the electronic means at once to provide a different group of timed periods for the various portions of the cycle.

2. In means for controlling welders, a plurality of thermionic tubes connected together for sequential operation so that each tube controls the energization of the next each tube controlling a portion of a complete weld cycle, a time control circuit for each thermionic tube including a condenser and a variable resistance connected to said tube, a second time control circuit for each tube including similar elements and switching means interconnected between the time control circuits and the tubes to provide selectivity as to which series of time control circuits are to be utilized.

3. In welding control means, a plurality of thermionic tubes connected together for sequential operation so that each tube controls the energization of the next each tube controlling the duration of a portion of a complete weld cycle, said tubes having control grids, means connected to said grids to bias the tubes to be nonconducting except when controlling its part of the cycle, a time control circuit including a condenser and a variable resistance for each tube, a second series of time control circuits including variable resistances that may be adjusted to different positions and switching means for alternately connecting either the first series or the second series of time control circuits to the grids of the tubes for providing a predetermined time of operation for the cycle of sequential tube operation.

4. In a system for controlling welding means having a plurality of thermionic conductive tubes connected together for sequential operation so that each tube controls the energization of the next each tube controlling the duration of a part of a complete welding cycle, a plurality of time control circuits for each tube and switching means for selectively interconnecting the time circuits with each tube to determine its conducting time for control purposes.

5. In a system for controlling welding means having a plurality of thermionic tubes interconnected for sequential operation, one for controlling the duration of each portion of the parts of a complete welding cycle and each having a control electrode, a first series of time control circuits including condensers and variable resistances so that the time of discharge of the condensers may be varied, a second similar series each of which may be set to a different position and switching means for alternately connecting the first or second series to the control electrodes of the tubes to control their time of conducting to alter the overall cycle.

6. In a system for controlling welding means having a plurality of thermionic tubes interconnected to operate in sequence and control the duration of the different portions of a complete welding cycle, a series of time control circuits for the tubes to control the energized and deenergized period of each and in combination the overall length of weld cycle, a second series of time control circuits having different values from the first series to provide different time periods, switching means to alternately connect one series of time control circuits or the other to the tubes and indicating means connected to the switching means to indicate which set of time control circuits is in use.

7. In control means, a work system having a plurality of sequentially actuated portions which additively compose a complete cycle of operation for said system, control means for each portion, said control means being interlocked to inaugurate the next succeeding portion at the conclusion of its own period, a group of adjustable time control circuits connectable to the control means to determine the energization time and duration for each portion, a second group of adjustable time control circuits connectable to the control means and a compound switching means connected to the two groups of time control circuits and to the control means to alternatively connect one complete group or the other to the control means to provide operation cycles consisting of different portion intervals.

JOSEPH F. SCHMIDT.

REFERENCES CITED

The following references are of record in the file of this patent:

UNITED STATES PATENTS

| Number | Name | Date |
|---|---|---|
| 2,008,413 | Dawson | July 16, 1935 |
| 2,269,967 | Whiteley | Jan. 13, 1942 |
| 2,274,158 | Penther | Feb. 24, 1942 |
| 2,295,601 | Overbeck | Sept. 15, 1942 |
| 2,429,186 | Johnson | Oct. 14, 1947 |
| 2,533,318 | Hartwig | Dec. 12, 1950 |